(12) United States Patent
Childress et al.

(10) Patent No.: US 11,308,236 B2
(45) Date of Patent: Apr. 19, 2022

(54) MANAGING OBFUSCATION OF REGULATED SENSITIVE DATA

(71) Applicant: KYNDRYL, INC., New York, NY (US)

(72) Inventors: Rhonda L. Childress, Austin, TX (US); Michael Bender, Rye Brook, NY (US); Natalie Brooks Powell, Bolingbrook, IL (US); Evelyn R Anderson, Houston, TX (US)

(73) Assignee: KYNDRYL, INC., New York, NY (US)

( * ) Notice: Subject to any disclaimer, the term of this patent is extended or adjusted under 35 U.S.C. 154(b) by 3 days.

(21) Appl. No.: 16/991,221

(22) Filed: Aug. 12, 2020

(65) Prior Publication Data

US 2022/0050919 A1    Feb. 17, 2022

(51) Int. Cl.
*G06F 21/62* (2013.01)
*G06F 21/84* (2013.01)
*H04L 29/06* (2006.01)

(52) U.S. Cl.
CPC .......... *G06F 21/6254* (2013.01); *G06F 21/84* (2013.01); *H04L 63/107* (2013.01); *H04L 63/20* (2013.01); *G06F 2221/032* (2013.01)

(58) Field of Classification Search
CPC .................. G06F 21/6254; G06F 21/84; G06F 2221/032; H04L 63/107; H04L 63/20
USPC .......................................................... 726/26
See application file for complete search history.

(56) References Cited

U.S. PATENT DOCUMENTS

| 7,627,562 | B2 | 12/2009 | Kacmarcik et al. |
| 7,724,918 | B2 | 5/2010 | Balakrishnan et al. |
| 8,156,159 | B2 | 4/2012 | Ebrahimi et al. |
| 9,129,119 | B2 | 9/2015 | Burke et al. |
| 9,241,004 | B1 | 1/2016 | April |
| 9,378,649 | B2 | 6/2016 | Kanzaki et al. |
| 10,089,287 | B2 | 10/2018 | Rebstock et al. |
| 2006/0075228 | A1 | 4/2006 | Black et al. |
| 2015/0040237 | A1 | 2/2015 | Vandervort |

(Continued)

OTHER PUBLICATIONS

"Major GDPR Fine Tracker—An Ongoing, Always-Up-To-Date List of Enforcement Actions", CoreView Blog, Aug. 3, 2020, Printed Aug. 10, 2020, 15 pages, <https://alpin.io/blog/gdpr-fines-list/>.

*Primary Examiner* — Kambiz Zand
*Assistant Examiner* — Aubrey H Wyszynski
(74) *Attorney, Agent, or Firm* — Ken Han; Andrew M. Calderon; Roberts Calderon Safran & Cole, P.C.

(57) ABSTRACT

In an approach to managing obfuscation of regulated sensitive data, one or more computer processors detect content for display on a computing device. One or more computer processors analyze the content for sensitive data. One or more computer processors retrieve one or more applicable regulations, where the regulations are associated with displaying sensitive data. One or more computer processors determine a location on the display for obfuscating the sensitive data in the content, based on the retrieved one or more applicable regulations. One or more computer processors identify one or more context rules applicable to the sensitive data in the content. One or more computer processors determine the one or more context rules override the one or more applicable regulations. One or more computer processors display the sensitive data in the content.

20 Claims, 4 Drawing Sheets

(56) References Cited

U.S. PATENT DOCUMENTS

| | | | |
|---|---|---|---|
| 2018/0336373 A1* | 11/2018 | Deenadayal | G06F 21/84 |
| 2019/0332784 A1 | 10/2019 | Mien et al. | |
| 2019/0354719 A1 | 11/2019 | Obembe et al. | |
| 2021/0136112 A1* | 5/2021 | Adams | H04L 63/20 |
| 2021/0140788 A1* | 5/2021 | Muro, II | G06T 11/60 |
| 2021/0312080 A1* | 10/2021 | Ramamurthy | G06F 21/6245 |

* cited by examiner

MANAGING OBFUSCATION OF REGULATED SENSITIVE DATA

BACKGROUND OF THE INVENTION

The present invention relates generally to the field of managing sensitive data, and more particularly to managing obfuscation of regulated sensitive data.

Data sanitization or data obfuscation techniques refer to techniques that remove or replace the sensitive text or information in confidential documents, in a manner that does not expose identifiable information or confidential information. When these desensitized or obfuscated documents are shared, the end users are then not able to gather any personal information related to individual data entities.

Enterprises attempt to strike a balance between protecting their sensitive, or personal, data while allowing their personnel to utilize that sensitive data when needed in the operations of the enterprise, both internally and externally. Sensitive data often consists of employee, customer, partner, and vendor records containing sensitive details, for example, names of individuals, addresses, telephone numbers, email addresses, social security numbers, credit card information, biometric data, health insurance details, health records, and financial records. Such sensitive information is often shared through a variety of applications, including mobile applications, which may be viewed internally and externally with proper authorization. Enterprises take steps to keep such sensitive data private both to protect their own interests and the interests of their clients, partners, and customers. Much of this data is required by law to be kept private. For example, the Payment Card Industry Data Security Standard (PCI DSS) act makes it mandatory for credit card payment processing companies to maintain data confidentiality while storing, processing, and exchanging credit card data. In another example, the General Data Protection Regulation (GDPR) is a regulation in European Union (EU) law on data protection and privacy in the EU and the European Economic Area (EEA). A further example is the California Consumer Protection Act (CCPA) which is targeted toward privacy of data of individuals.

SUMMARY

Embodiments of the present invention disclose a method, a computer program product, and a system for managing obfuscation of regulated sensitive data. The method may include one or more computer processors detecting content for display on a computing device. One or more computer processors analyze the content for sensitive data. One or more computer processors retrieve one or more applicable regulations, where the regulations are associated with displaying sensitive data. One or more computer processors determine a location on the display for obfuscating the sensitive data in the content, based on the retrieved one or more applicable regulations. One or more computer processors identify one or more context rules applicable to the sensitive data in the content. One or more computer processors determine the one or more context rules override the one or more applicable regulations. One or more computer processors display the sensitive data in the content.

DETAILED DESCRIPTION

Although there are many regulations regarding data privacy, individuals may accidentally share information that the individuals are authorized to see, but others are not. Relying on individuals to remember to be security conscious and not share personal information on a business asset may have a risk of non-compliance to regulations. In addition, fines for accidental personal data disclosures are on the rise. Regulations such as the General Data Protection Regulation (GDPR) and associated country-specific variations include monetary fines for breaking the regulations. In addition to regulatory requirements, individuals may also have contextual requirements for when personal data may be shared. For example, if a user has a corporate-supplied phone for use with work, there may be contextual rules and/or regulations related to corporate use. Embodiments of the present invention recognize that accidental sharing of personal data may be prevented by providing a system that obfuscates personal data based on both regulations and individual context. Embodiments of the present invention also recognize that efficiency may be gained by enabling a user to establish an obfuscation configuration for data associated with individual context. Implementation of embodiments of the invention may take a variety of forms, and exemplary implementation details are discussed subsequently with reference to the Figures.

Figure 1:
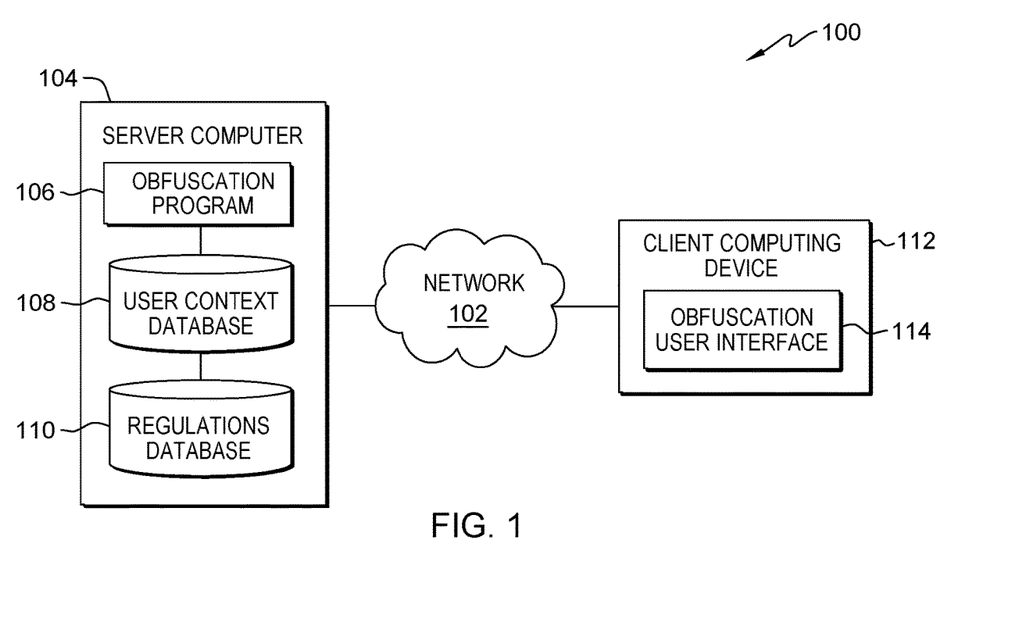
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 112, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 112, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes obfuscation program 106, user context database 108, and regulations database 110. Server computer 104 may include internal and external hardware components, as depicted and described in further detail with respect to FIG. 4.

Obfuscation program 106 prevents displaying or sharing private data on a display of a computing device unless the user of the computing device authorizes the data to be used. Obfuscation program 106 captures authorized data to share from a trusted source and determines which, if any, of that data to review for possible obfuscation. Obfuscation program 106 determines what locations on a display to obfuscate, based on a corpus of regulations and then determines if the user of the display has provided any obfuscation overrides. Obfuscation program 106 detects displayable content. Obfuscation program 106 retrieves any applicable regulations for displaying the content. Obfuscation program 106 analyzes the display and determines a location on the display for which data must be obfuscated, based on the regulations. Obfuscation program 106 retrieves a context rule set provided by the user and identifies any applicable context. If obfuscation program 106 determines any context overrides apply, then obfuscation program 106 displays the context with no obfuscation. Obfuscation program 106 is depicted and described in further detail with respect to FIG. 2A, FIG. 2B, and FIG. 3.

User context database 108 and regulations database 110 are each a repository for data used by obfuscation program 106. User context database 108 and regulations database 110 can each represent one or more databases. In the depicted embodiment user context database 108 and regulations database 110 reside on server computer 104. In another embodiment, user context database 108 and regulations database 110 may each reside elsewhere within distributed data processing environment 100, provided obfuscation program 106 has access to user context database 108 and regulations database 110. A database is an organized collection of data. User context database 108 and regulations database 110 can each be implemented with any type of storage device capable of storing data and configuration files that can be accessed and utilized by obfuscation program 106, such as a database server, a hard disk drive, or a flash memory. User context database 108 stores personal information received from a user of client computing device 112 and associated contextual requirements for sharing or not sharing the personal information. Regulations database 110 stores rules and regulations associated with data privacy.

The present invention may contain various accessible data sources, such as user context database 108 and regulations database 110, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Obfuscation program 106 enables the authorized and secure processing of personal data. Obfuscation program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Obfuscation program 106 provides information regarding personal data and the nature (e.g., type, scope, purpose, duration, etc.) of the processing. Obfuscation program 106 provides the user with copies of stored personal data. Obfuscation program 106 allows the correction or completion of incorrect or incomplete personal data. Obfuscation program 106 allows the immediate deletion of personal data. As used herein, the term "personal data" is synonymous with the terms "personal information," "sensitive data," "sensitive information," "sensitive text," "private data," "private information," and "identifiable information."

Client computing device 112 can be one or more of a laptop computer, a tablet computer, a smart phone, smart watch, a smart speaker, or any programmable electronic device capable of communicating with various components and devices within distributed data processing environment 100, via network 102. Client computing device 112 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 112 may be integrated into a vehicle of the user. For example, client computing device 112 may include a heads-up display in the windshield of the vehicle. In general, client computing device 112 represents one or more programmable electronic devices or combination of programmable electronic devices capable of executing machine readable program instructions and communicating with other computing devices (not shown) within distributed data processing environment 100 via a network, such as network 102. Client computing device 112 includes an instance of obfuscation user interface 114.

Obfuscation user interface 114 provides an interface between obfuscation program 106 on server computer 104 and a user of client computing device 112. In one embodiment, obfuscation user interface 114 is mobile application software. Mobile application software, or an "app," is a computer program designed to run on smart phones, tablet computers and other mobile devices. In one embodiment, obfuscation user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Obfuscation user interface 114 enables a user of client computing device 112 to input user profile data regarding rules and prioritization context for personal data obfuscation into user context database 108. Obfuscation rules and prioritization may be associated with personal data which include, but is not limited to, a name of the user, addresses, telephone numbers, email addresses, a social security number, credit card information, health insurance details, health records, financial records, an image of the user, devices owned and/or used by the user, and a location of the user.

Figure 2A:
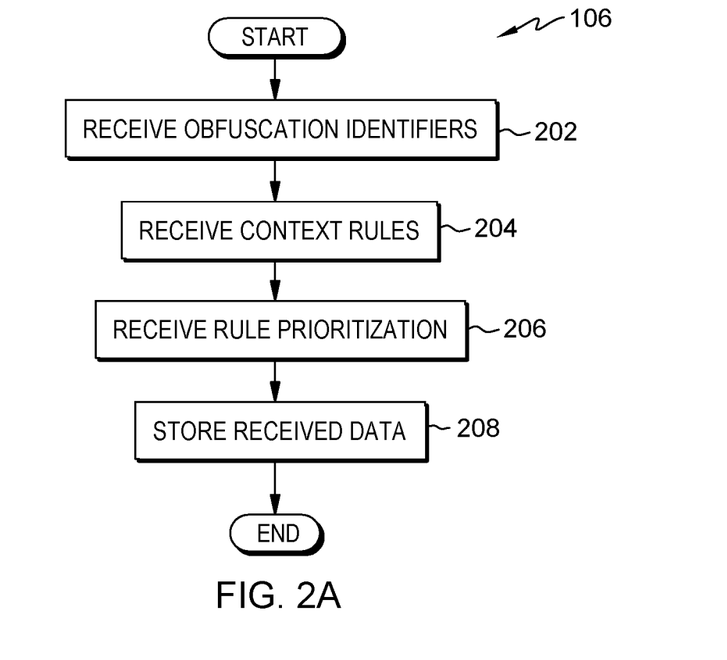
FIG. 2A is a flowchart depicting operational steps of an obfuscation program, on a server computer within the distributed data processing environment of FIG. 1, for determining personal data obfuscation context rules, in accordance with an embodiment of the present invention.

FIG. 2A is a flowchart depicting operational steps of obfuscation program 106, on server computer 104 within distributed data processing environment 100 of FIG. 1, for determining personal data obfuscation context rules, in accordance with an embodiment of the present invention.

Obfuscation program 106 receives obfuscation identifiers (step 202). In an embodiment, when a user of client computing device 112 enters or selects identifiers of personal information subject to obfuscation rules via obfuscation user interface 114, obfuscation program 106 receives the identifiers. Identifiers can be any data, text, or image that can be used to identify the user. For example, identifiers can include, but are not limited to, a name, a nickname, an address, a phone number, a social security number, a driver's license number, a license plate number, a location of the user, a device identification, a job title, an employer name, an image of the face of the user, an email address, a password, credit card information, biometric data, health insurance details, a health record, and a financial record. In an embodiment, the user logs in to obfuscation user interface 114 with a corporate ID. In an embodiment, obfuscation program 106 receives a still or video image from the user, via obfuscation user interface 114 which can be used for general sharing and/or for facial comparison or recognition. In an embodiment, obfuscation program 106 determines faces or other body parts using cognitive analysis of shapes in an image. In an embodiment, obfuscation program 106 receives a list of devices used by the user for which context rules apply. In an embodiment, obfuscation program 106 receives a list of devices used by the user with which obfuscation program 106 can determine the location of the user. In an embodiment, the data received by obfuscation program 106 may be included in a user profile.

Obfuscation program 106 receives context rules (step 204). In an embodiment, when a user of client computing device 112 enters or selects context rules associated with the previously provided identifiers, via obfuscation user interface 114, obfuscation program 106 receives the context rules. The user can define or specify rules associated with authorization to share or not to share any of the provided identifiers depending on the context of each situation. The context may include, but is not limited to, the location of the user, the device the user is using, applications on a device, applications in active use on a device, whether content is being recorded, or anything else defined by the user as a condition for which obfuscation program 106 considers data obfuscation. For example, the user can define which devices can be used to determine the location of the user and to display the location of the user, using movement based on a mobile phone Global Positioning Service (GPS) and current GPS coordinates or IP address. In another example, obfuscation program 106 may determine a user's device location by detecting active use of the device, such as typing, application interaction, or interaction with a touch screen with the associated GPS coordinates or IP address. In an embodiment, the user can quantify authorized sharing based on environmental conditions. For example, the user can specify sharing personal information only on a local device. In another example, the user may specify that personal data can only be shared when the user is located in an office building. In an embodiment, a user can define context rules that are either inclusive or exclusive. For example, if a user trusts collaboration software X but not collaboration software Y, then the user can define that personal information may be shared only when collaboration software X is in use, or the user can define that personal information may not be shared when collaboration software Y is in use. In another example, a user may define that the face of the user may be displayed unless an application in use on the user's device is recording content. In a further example, the user may include an image of a family member's house address in user context database 108 for use on an exclusion rule, i.e., although obfuscation program 106 has access to the image for comparison usage, obfuscation program 106 is not authorized to display the image. In an embodiment, the user can define context rules around images of the user, such as whether clothing matches or a specific style of clothing is in the image. For example, the user is willing to share an image of the user only when the user is wearing a suit, so the user defines a context rule that says if obfuscation program 106 determines the user is not wearing a suit, then obfuscation program 106 does not display the image.

Obfuscation program 106 receives rule prioritization (step 206). In an embodiment, when a user of client computing device 112 enters or selects context rule prioritization associated with the previously provided context rules, via obfuscation user interface 114, obfuscation program 106 receives the priorities of the context rules, i.e., context overrides, or when context rules have precedence over the applicable regulations as well as over other context rules. The user can configure multiple rules to apply for determining context and configure the weights of the applicable rules in order for obfuscation program 106 to determine which decision to make regarding data obfuscation. For example, a user may define that obfuscation program 106 can display an image of the face of the user if the user is using a corporate or work phone. The user may also define that obfuscation program 106 may not display an image of the user on the weekend. If the user is using the corporate phone on a Saturday, then the user can define prioritization, or a hierarchy, of the rules, such that the corporate phone rule is given a higher weight than the weekend rule. In another example, a user may authorize obfuscation program 106 to use the user's image when the user is actively using collaboration software, however the user does not authorize sharing the license plate number on the user's vehicle. Thus, when obfuscation program 106 detects an image of the user in a vehicle while actively using collaboration software, obfuscation program 106 displays the image of the user but obfuscates the image of the license plate. In an embodiment, obfuscation program 106 can prioritize rules amongst multiple users. For example, three users are on a conference call that is being recorded on collaboration software. Two of the users have authorized use of their image, but the third user has not. When creating the conference call playback, obfuscation program 106 obfuscates the image of the third user but displays the images of the first two users.

Obfuscation program 106 stores the received data (step 208). In an embodiment, obfuscation program 106 stores the obfuscation identifiers, the context rules, and the context rule prioritization data received in the previous steps in user context database 108. Once stored, obfuscation program 106 can retrieve the data as needed to analyze obfuscation requirements.

Figure 2B:
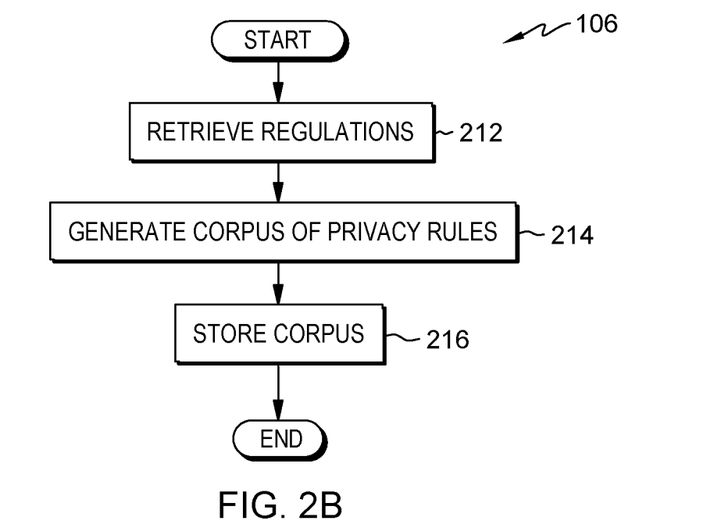
FIG. 2B is a flowchart depicting operational steps of the obfuscation program, on the server computer within the distributed data processing environment of FIG. 1, for determining personal data obfuscation regulations, in accordance with an embodiment of the present invention.

FIG. 2B is a flowchart depicting operational steps of obfuscation program 106, on server computer 104 within distributed data processing environment 100 of FIG. 1, for determining personal data obfuscation regulations, in accordance with an embodiment of the present invention.

Obfuscation program 106 retrieves regulations (step 212). In an embodiment, obfuscation program 106 retrieves data sharing and data privacy regulations from one or more publicly available sources. As used herein, the term regulations can include laws, rules, regulations, polices, etc. In an embodiment, one or more of the publicly available sources are trusted sources. For example, obfuscation program 106 retrieves data privacy regulations associated with the General Data Protection Regulation (GDPR). In another embodiment, obfuscation program 106 retrieves data sharing and data privacy regulations from one or more corporate databases, which have details of corporate polices. In an embodiment, because corporate policies are not universal, the policies found in corporate databases may not be trusted sources. In an embodiment, obfuscation program 106 also retrieves the origin of each rule or regulation such that conflicting rules can be resolved based on the location and the context of the user. For example, rule 1 applies to a corporation, while rule 2 applies to a location in a specific country. In a further example, a user may be located in a country with few privacy rules, but the user is using a corporate smart phone. Obfuscation program 106 determines any data obfuscation is based on the corporate rules, not the country rules, since the corporate rules are more stringent. In an embodiment, obfuscation program 106 retrieves regulations related to an entity, e.g., a government entity, that has declared rules for capturing device location, including all devices displaying the protected data.

Obfuscation program 106 generates a corpus of privacy rules (step 214). In an embodiment, obfuscation program 106 generates a corpus of data privacy rules by ingesting the regulations regarding data sharing that were retrieved in the previous step. In an embodiment, obfuscation program 106 uses one or more natural language processing (NLP) techniques to analyze documents to determine the laws and rules. Via NLP, obfuscation program 106 can identify when an entity (e.g., a country) allows a sub-entity (e.g., a corporation located in the country) to permit or not permit a higher level of rules. If not permitted, then the ruling entity prevails; if permitted, then the most stringent rule prevails. In an embodiment, obfuscation program 106 includes synonyms of words or terms that refer to personal data in the corpus. In another embodiment, obfuscation program 106 includes translations of words or terms that refer to personal data in one or more additional languages in the corpus.

Obfuscation program 106 stores the corpus (step 216). In an embodiment, obfuscation program 106 stores the corpus of data privacy rules and regulations, generated in the previous step, in regulations database 110. Once stored, obfuscation program 106 can retrieve the data as needed to analyze obfuscation requirements.

Figure 3:
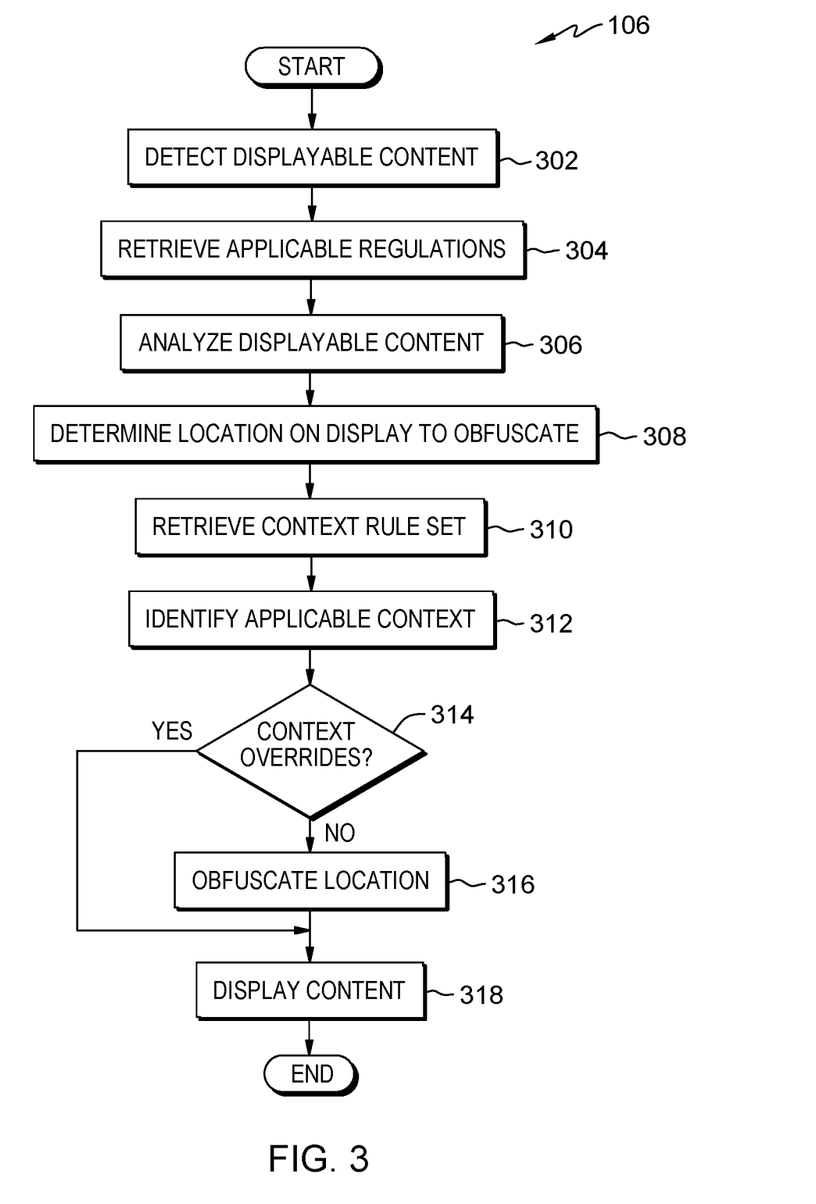
FIG. 3 is a flowchart depicting operational steps of the obfuscation program, on the server computer within the distributed data processing environment of FIG. 1, for obfuscating personal data, in accordance with an embodiment of the present invention.

FIG. 3 is a flowchart depicting operational steps of obfuscation program 106, on server computer 104 within distributed data processing environment 100 of FIG. 1, for obfuscating personal data, in accordance with an embodiment of the present invention.

Obfuscation program 106 detects displayable content (step 302). In an embodiment, when a user of client computing device 112 initiates an application that may display personal information on a display associated with client computing device 112, obfuscation program 106 detects displayable content. For example, the application may be a corporate database or application user interface. In another example, the application may be a link to a web page on a web browser.

Obfuscation program 106 retrieves applicable regulations (step 304). In an embodiment, obfuscation program 106 determines the geo-location of client computing device 112 and retrieves applicable regulations from regulations database 110 which are associated with the geo-location. Obfuscation program 106 may use one or more techniques known in the art to determine the location of client computing device 112. For example, obfuscation program 106 may determine the GPS coordinates of client computing device 112. In an embodiment, obfuscation program 106 continuously monitors the location of client computing device 112 in order to determine when the movement of client computing device 112 triggers a change in applicable regulations. For example, if the user of client computing device 112 is riding in a car and crosses a border between two countries, then obfuscation program 106 determines the applicable regulations for the new country client computing device 112 is in. As was discussed with respect to FIG. 2B, regulations database 110 may include data sharing and data privacy regulations from one or more publicly available sources, as well as data privacy regulations from one or more corporate databases. If client computing device 112 is a personal device of the user, then corporate policies may not be applicable. If client computing device 112 is a corporate-supplied device, then corporate policies may apply. In an embodiment, obfuscation program 106 determines prioritization of the applicable regulations based on location. For example, priorities for the determining the need for obfuscation may be area, such as the European Union, then country, then state, then company.

Obfuscation program 106 analyzes the displayable content (step 306). In an embodiment, prior to displaying the detected content, obfuscation program 106 analyzes the content in order to determine, based on the applicable regulations, if any of the content is regulated as private or personal information. Obfuscation program 106 compares the content to the corpus of privacy rules in regulations database 110. In an embodiment, obfuscation program 106 determines whether any identified fields in the displayable content match patterns for personal information. For example, if a field is named "social security number" or "credit card number," then obfuscation program 106 recognizes that an entry following the field name is likely to be personal information. In an embodiment, in addition to displayable text, obfuscation program 106 analyzes any images included in the displayable content. In an embodiment, obfuscation program 106 applies one or more facial recognition techniques to any images in the displayable content for comparison to the corpus. If obfuscation program 106 matches a face to a rule in the corpus, then obfuscation program 106 determines obfuscation of the image is required. In an embodiment, obfuscation program 106 may apply one or more optical character recognition (OCR) techniques to any text in an image in order to compare the text to the obfuscation rules in the corpus.

Obfuscation program 106 determines a location on the display to obfuscate (step 308). In an embodiment, based on the analysis of the displayable content, obfuscation program 106 determines one or more locations on the display associated with client computing device 112 to obfuscate in order to prevent sharing of personal information. In an embodiment, obfuscation program 106 may determine areas to obfuscate based on field names. In another embodiment, obfuscation program 106 may create a location grid on the display and obfuscate one or more areas in the grid.

Obfuscation program 106 retrieves context rule set (step 310). In an embodiment, obfuscation program 106 retrieves an applicable context rule set, e.g., the set of context rules associated with the user of client computing device 112, from user context database 108. As discussed with respect to FIG. 2A, the user of client computing device 112 defines one or more context rules for sharing or obfuscating personal information.

Obfuscation program 106 identifies applicable context (step 312). In an embodiment, obfuscation program 106 monitors the context of the user of client computing device 112 in order to identify any context applicable to the displayable content. For example, obfuscation program 106 monitors the location of client computing device 112 to determine whether any of the rules provided by the user in user context database 108 apply to the current location, such as a rule that says to never show the house of the user. In another example, obfuscation program 106 determines which device of one or more client computing devices 112 is in use, such as whether client computing device 112 is a personal laptop or a corporate smart phone. In yet another example, obfuscation program 106 may determine whether any images include details to which an applicable rule applies, such as a face other than the user, an address of a home, or a license plate on a vehicle.

Obfuscation program 106 determines whether there are any context overrides (decision block 314). In an embodiment, obfuscation program 106 compares the context rules to the applicable regulations and determines whether any of the context rules override, i.e., have precedence, over the applicable regulations. In an embodiment, obfuscation program 106 analyzes prioritization rules defined by the user and stored in user context database 108. Prioritization rules may apply between user defined context rules and regulations. Prioritization rules may also apply between two or more user defined context rules. For example, the user may have defined that obfuscation program 106 may display an image of the face of the user when the user is located in a home office, however obfuscation program 106 may not display the image of the user's face when faces of the user's family are in proximity to the user's face. Thus, if obfuscation program 106 detects images of faces of the user's family with the user in the home office, then obfuscation program 106 does not display the image of the user's face.

If obfuscation program 106 determines there are no context overrides ("no" branch, decision block 314), then obfuscation program 106 obfuscates the location (step 316). In an embodiment, if obfuscation program 106 determines there are no context rules that override applicable regulations or other context rules, then obfuscation program 106 obfuscates the one or more locations on the display associated with client computing device 112, as determined in step 308, in order to prevent sharing of personal information. In an embodiment, obfuscation program 106 uses one or more methods to perform obfuscation. For example, obfuscation program 106 may use blocking, blurring, or substitution of values, such as text, numbers, images, etc. The obfuscation renders the personal information obscure, unclear, or unintelligible.

If obfuscation program 106 determines there are context overrides ("yes" branch, decision block 314), or responsive to obfuscating the location, obfuscation program 106 displays content (step 318). In an embodiment, obfuscation program 106 displays the displayable content with the appropriate obfuscation based on the retrieved applicable regulations and the identified applicable context, such that restricted data is not displayed.

Figure 4:
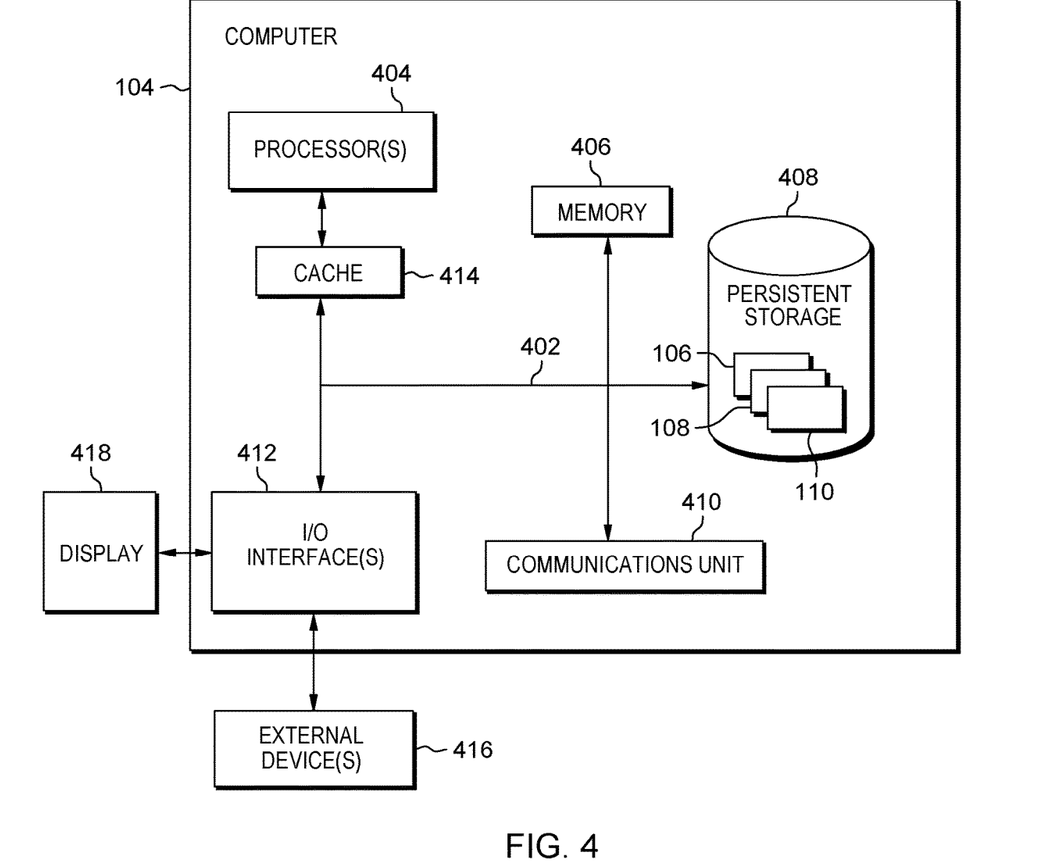
FIG. 4 depicts a block diagram of components of the server computer executing the obfuscation program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., obfuscation program 106, user context database 108, and regulations database 110, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 112. In these examples, communications unit 410 includes one or more network interface cards. Communications unit 410 may provide communications through the use of either or both physical and wireless communications links. Obfuscation program 106, user context database 108, regulations database 110, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., obfuscation program 106, user context database 108, and regulations database 110 on server computer 104, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    detecting, by one or more computer processors, content for displaying on a display of a computing device;
    analyzing, by one or more computer processors, the content for sensitive data based on obfuscation identifiers that include data that is used to identify a user of the computing device;
    retrieving, by one or more computer processors, one or more applicable regulations, wherein the regulations are associated with data sharing and data privacy regulations associated with displaying the sensitive data;
    determining, by one or more computer processors, a location on the display for obfuscating the sensitive data in the content, based on the retrieved one or more applicable regulations;
    identifying, by one or more computer processor, one or more context rules associated with sensitive data of the user of the computing device, wherein the sensitive data of the user of the computing device is applicable to the sensitive data in the content;
    determining, by one or more computer processors, whether the one or more context rules override the one or more applicable regulations with respect to displaying the sensitive data; and
    displaying, by one or more computer processors, the content in accordance with the determination of whether one or more context rules override the one or more applicable regulations with respect to displaying the sensitive data.

2. The method of claim 1, further comprising:
    determining, by one or more computer processors, the one or more context rules do not override the one or more applicable regulations; and
    obfuscating, by one or more computer processors, the sensitive data in the content.

3. The method of claim 1, further comprising:
    determining, by one or more computer processors, the one or more context rules override the one or more applicable regulations; and
    displaying, by one or more computer processors, the sensitive data in the content.

4. The method of claim 1, wherein retrieving the one or more applicable regulations further comprises:
    retrieving, by one or more computer processors, one or more data privacy regulations;
    based on the retrieved one or more data privacy regulations, generating, by one or more computer processors, a corpus of data privacy rules; and
    storing, by one or more computer processors, the corpus of data privacy rules.

5. The method of claim 4, wherein retrieving the one or more data privacy regulations further comprises:
    determining, by the one or more computer processors, a geo-location of the computing device;
    retrieving, by one or more computer processors, one or more data privacy regulations associated with the geo-location from one or more publicly available and trusted sources; and
    retrieving, by one or more computer processors, one or more data privacy regulations from one or more corporate databases.

6. The method of claim 4, further comprising, retrieving, by one or more computer processors, an origin of each of the one or more data privacy regulations.

7. The method of claim 1, further comprising, monitoring, by one or more computer processors, a geo-location of the computing device to change applied data privacy regulations based on a change in the geo-location of the computing device.

8. The method of claim 1, further comprising:
    receiving, by one or more computer processors, the one or more obfuscation identifiers;
    receiving, by one or more computer processors, the one or more context rules, wherein each of the one or more context rules is associated with at least one of the one or more obfuscation identifiers;
    receiving, by one or more computer processors, priorities of the one or more context rules;
    storing, by one or more computer processors, the received one or more obfuscation identifiers, the received one or more context rules, and the received priorities of the one or more context rules; and resolving, by one or more computer processors, the one or more context rules and the one or more applicable regulations based on a location and a context of the user.

9. A computer program product comprising:
one or more computer readable storage media and program instructions collectively stored on the one or more computer readable storage media, the stored program instructions comprising:
program instructions to detect content for displaying on a display of a computing device;
program instructions to analyze the content for sensitive data based on obfuscation identifiers that include data that is used to identify a user of the computing device;
program instructions to determine a geo-location of the computing device;
program instructions to retrieve one or more applicable regulations associated with the geo-location, wherein the regulations are associated with data sharing and data privacy regulations associated with displaying the sensitive data;
program instructions to determine a location on the display for obfuscating the sensitive data in the content, based on the retrieved one or more applicable regulations;
program instructions to identify one or more context rules associated with sensitive data of the user of the computing device applicable to the sensitive data in the content, wherein the sensitive data of the user of the computing device is applicable to the sensitive data in the content;
program instructions to determine whether the one or more context rules override the one or more applicable regulations with respect to displaying the sensitive data; and
program instructions to display the content in accordance with the determination of whether one or more context rules override the one or more applicable regulations with respect to displaying the sensitive data.

10. The computer program product of claim 9, the stored program instructions further comprising:
program instructions to determine the one or more context rules do not override the one or more applicable regulations; and
program instructions to obfuscate the sensitive data in the content.

11. The computer program product of claim 9, the stored program instructions further comprising:
program instructions to determine the one or more context rules override the one or more applicable regulations; and
program instructions to display the sensitive data in the content.

12. The computer program product of claim 9, wherein program instructions to retrieve the one or more applicable regulations comprise:
program instructions to retrieve one or more data privacy regulations;
based on the retrieved one or more data privacy regulations, program instructions to generate a corpus of data privacy rules; and
program instructions to store the corpus of data privacy rules.

13. The computer program product of claim 12, wherein program instructions to retrieve the one or more data privacy regulations comprise:
program instructions to retrieve one or more data privacy regulations from one or more publicly available sources; and
program instructions to retrieve one or more data privacy regulations from one or more corporate databases.

14. The computer program product of claim 9, the stored program instructions further comprising:
program instructions to receive the one or more obfuscation identifiers;
program instructions to receive the one or more context rules, wherein each of the one or more context rules is associated with at least one of the one or more obfuscation identifiers;
program instructions to receive priorities of the one or more context rules;
program instructions to store the received one or more obfuscation identifiers, the received one or more context rules, and the received priorities of the one or more context rules; and
program instructions to resolve the one or more context rules and the one or more applicable regulations based on a location and a context of the user.

15. A computer system comprising:
one or more computer processors;
one or more computer readable storage media;
program instructions collectively stored on the one or more computer readable storage media for execution by at least one of the one or more computer processors, the stored program instructions comprising:
program instructions to detect content for displaying on a display of a computing device;
program instructions to analyze the content for sensitive data based on obfuscation identifiers that include a data, a text, or an image that is used to identify a user of the computing device;
program instructions to retrieve one or more applicable regulations, wherein the regulations are associated with data sharing and data privacy regulations associated with displaying the sensitive data;
program instructions to determine a location on the display for obfuscating the sensitive data in the content, based on the retrieved one or more applicable regulations;
program instructions to identify one or more context rules associated with sensitive data of the user of the computing device applicable to the sensitive data in the content, wherein the sensitive data of the user of the computing device is applicable to the sensitive data in the content;
program instructions to determine whether the one or more context rules override the one or more applicable regulations with respect to displaying the sensitive data; and
program instructions to display the content in accordance with the determination of whether one or more context rules override the one or more applicable regulations with respect to displaying the sensitive data.

16. The computer system of claim 15, the stored program instructions further comprising:
program instructions to determine the one or more context rules do not override the one or more applicable regulations; and program instructions to obfuscate the sensitive data in the content.

17. The computer system of claim 15, the stored program instructions further comprising:
    program instructions to determine the one or more context rules override the one or more applicable regulations; and
    program instructions to display the sensitive data in the content.

18. The computer system of claim 15, wherein program instructions to retrieve the one or more applicable regulations comprise:
    program instructions to retrieve one or more data privacy regulations;
    based on the retrieved one or more data privacy regulations, program instructions to generate a corpus of data privacy rules; and
    program instructions to store the corpus of data privacy rules.

19. The computer system of claim 18, wherein program instructions to retrieve the one or more data privacy regulations comprise:
    program instructions to determine a geo-location of the computing device;
    program instructions to retrieve one or more data privacy regulations associated with the geo-location from one or more publicly available and trusted sources; and
    program instructions to retrieve one or more data privacy regulations from one or more corporate databases.

20. The computer system of claim 15, the stored program instructions further comprising:
    program instructions to receive the one or more obfuscation identifiers;
    program instructions to receive the one or more context rules, wherein each of the one or more context rules is associated with at least one of the one or more obfuscation identifiers;
    program instructions to receive priorities of the one or more context rules;
    program instructions to store the received one or more obfuscation identifiers, the received one or more context rules, and the received priorities of the one or more context rules; and
    program instructions to resolve the one or more context rules and the one or more applicable regulations based on a location and a context of the user.

\* \* \* \* \*